United States Patent Office

3,182,101
Patented May 4, 1965

3,182,101
BLENDS OF LINEAR POLYETHYLENE AND ETHYLENE-VINYL ACETATE COPOLYMER
Richard Watkin Rees, Wilmington, Del., assignor to E. I. du Pont de Nemours and Company, Wilmington, Del., a corporation of Delaware
No Drawing. Filed Jan. 5, 1961, Ser. No. 80,745
4 Claims. (Cl. 260—885)

This invention relates to a new composition of matter for use as an injection molding resin. More particularly this invention is especially concerned with a composition of matter comprising a blend of ethylene-vinyl acetate copolymers, and high density polyethylene. High density polyethylene is defined for the purposes of the present invention as polyethylene having a density of .940 to .970 g./cc. and is generally produced by the polymerization of ethylene with a "coordination catalyst," i.e., a catalyst based on reduced transition metal halides, such as described in U.S. 2,862,917. The copolymers employed in the present invention are produced by the copolymerization of ethylene with vinyl acetate using polymerization conditions developed for the polymerization of ethylene at pressures 50 to 3,000 atmospheres with a free radical forming catalyst such as peroxides.

In the production of large thin-walled articles such as garbage cans by injection molding, it is necessary as a minimum requirement to employ a polymer that will after being formed into an article hold its shape, i.e., the polymer must have a stiffness of at least about 25,000 p.s.i.

A further requirement of a polymer to be useful in deep drawing processes is that it have a melt index of such a level that the polymer will flow into the deep areas of the mold when injected. This property is known in the art as melt flow. A satisfactory melt index is about 5 to 25 g./10 minutes as measured by the A.S.T.M. D-1238-52T testing procedure.

A polymer that is useful for fabricating articles and particularly containers must have high impact resistance, that is the fabricated article must be able to withstand strenuous use without cracking or breaking at low temperatures.

A final requirement for a highly useful molding polymer is that the article produced be substantially free from warping.

It is generally true in polymer chemistry, that as the stiffness of a polymer increases, the resistance to impact is lessened. Thus in the general case, it is necessary to compromise impact resistance with stiffness to produce a useful polymer.

It is the object of the present invention to produce a polymer that has a melt index suitable for injection molding operations, and has a stiffness sufficient to maintain its form when molded into large articles. It is the further object of this invention to produce a polymer that when molded into a large thin-walled article will have an exceedingly high impact resistance—so that it will withstand severe handling. It is a further object of the invention to produce a polymer that when molded into an article will not warp. Other objects and uses of the polymer of this invention will be apparent to one skilled in the art from the remainder of the disclosure.

The present invention is based on the discovery that a blend having a melt index of 5 to 25 g./10 minutes of 10 to 50% by weight high density polyethylene having a density of .940 to .970 g./cc. and a melt index of 1 to 20 g./10 minutes as measured by the A.S.T.M. D-1238-52T testing procedure, and 50 to 90% copolymer of ethylene and vinyl acetate containing 1 to 15% by weight vinyl acetate, and having a melt index of from 0.1 to 30, and a density of from 0.910 to 0.940 g./cc., has surprisingly superior properties. However, in no case should the total amount of vinyl acetate present in the blend be less than about 1.0% by weight. In particular, it has been found that the blend is quite stiff and yet is highly impact resistant even at low temperatures, and it has been further found that the blend may be employed in injection molding operations to produce substantially warp-free articles under conditions that cause warping of either high density polyethylene, or conventional polyethylene.

In order to test the impact resistance of the polymers, a two-pound steel ball was mounted in a tower and allowed to drop from various heights on molded file boxes and file box lids cooled to $-18°$ C. These test conditions were suitable because the repeatability of the test was surprisingly good, and since large differences in minimum break height were observed between different resins. Each resin was tested at least 10 times, and the spread of results was generally less than 10% for any particular resin.

The following examples illustrate a method of obtaining the composition of this invention, and further illustrate the utility of the composition.

EXAMPLE I

Twenty-five parts by weight of total composition of high density polyethylene (density .950) having a melt index of 6, and seventy-five parts by weight of total composition, of ethylene/vinyl acetate copolymer, prepared in an autoclave at 21,000 p.s.i., having a 4.6% by weight vinyl acetate content, a melt index of 1.8 g./10 min. and a density of .9249, were cube blended by tumbling and extruding through a 2″ extruder equipped with a nylon screw and two mixing torpedoes at a melt temperature of 180–185° C. The blend had the following properties:

Melt index _____ 9.3
Density _____ .9313
Stiffness _____ p.s.i__ 30,000

File boxes and lids 0.07″ thick were molded from the blend using a 12 oz. Watson Stillman injection molding machine. The molding conditions were as follows:

Melt temperature _____ ° C__ 225
Mold temperature _____ ° C__ 55
Cycle _____ seconds__ 24

The lids and boxes were then cooled to $-18°$ C. in a glycol bath and struck with a two-pound steel ball freely falling from a height of 50 feet. No failures occurred after ten tests.

The boxes and lids were free from warpage.

Table I summarizes other examples of different compositions obtained by the mixing procedure of Example I, and tested by the procedure of Example I.

Table I

| Ex. | Blend | | | High density polyethylene | | | Copolymer | | | | Product properties | | |
|---|---|---|---|---|---|---|---|---|---|---|---|---|---|
| | Melt Index, g./10 min. | Density in g./cc. | Stiffness in p.s.i. | Weight percent | Melt index, g./10 min. | Density in g./cc. | Comonomer | Weight percent of comonomer | Melt index, g./10 min. copolymer | Density in g./cc. copolymer | Minimum break height, feet | | Appearance |
| | | | | | | | | | | | Boxes | Lids | |
| 2 | 9.84 | .9301 | 27,183 | 15 | 5 | .96 | VA | 4.6 | 9.8 | .9249 | >50 | >50 | Dull flow marks, slightly warped. |
| 3 | 8.064 | .9321 | -------- | 15 | 5 | .96 | VA | 10.1 | 7.7 | .9296 | 50 | >50 | Good surface, no warpage. |
| 4 | 8.540 | .9356 | -------- | 25 | 5 | .96 | VA | 10.1 | 7.7 | .9296 | >50 | >50 | Do. |
| 5 | 9.48 | .9299 | 27,000 | 20 | 6 | .95 | VA | 4.6 | 9.8 | .9249 | >50 | >50 | Farily good surface, very slight warpage. |
| 6 | 9.17 | .9304 | 27,000 | 20 | 6 | .95 | VA | 4.6 | 9.8 | .9249 | >50 | >50 | Do. |
| 7 | 10.33 | .9293 | 24,800 | 20 | 9 | .95 | VA | 4.6 | 9.8 | .9249 | >50 | >50 | Do. |
| 8 | 9.32 | .9313 | 30,600 | 25 | 6 | .95 | VA | 4.6 | 9.8 | .9249 | >50 | >50 | Do. |
| 9 | 12.0 | -------- | -------- | 25 | -------- | .96 | VA | 4.6 | 9.8 | .9249 | >50 | >50 | Glossy smooth, considerable warpage. |
| 10 | 11.35 | -------- | -------- | 25 | -------- | .96 | VA | 4.6 | 9.8 | .9249 | >50 | >50 | Glossy smooth, no warpage. |
| 11 | 7.65 | .9366 | 31,860 | 15 | 6 | .95 | DEM | 4.0 | 8.6 | .932 | >50 | >50 | Fairly dull, warped. |
| 12 | 6.94 | .9381 | 42,270 | 25 | 6 | .95 | DEM | 4.0 | 8.6 | .932 | >50 | >50 | Do. |
| 13 | 7.00 | .9267 | 33,300 | 5 | 3 | .95 | -------- | -------- | 25% .3 / 75% 20 | .921 / .923 | <5 | 43 | Poor surface gloss warpage. |
| 14 | 8.05 | .9262 | 33,500 | -------- | -------- | -------- | -------- | -------- | 25% .3 / 75% 20 | .921 / .923 | 21 | >50 | Poor surface gloss flow marks, badly warped. |
| 15 | 8.07 | .9278 | 44,400 | 25 | 6 | .95 | -------- | -------- | 10.3 | .919 | 23 | 33 | Good surface, badly warped. |

Upon discovery of the excellent results obtained by the use of vinyl acetate/ethylene copolymer blended with high density polyethylene as shown in the above Examples 1–9, it was decided to try other polar monomers to see if they would work as well as vinyl acetate. Thus in Examples 10 and 11 diethyl maleate was employed as the comonomer in the copolymer. The diethyl maleate produced the highly beneficial result of improved impact resistance, but although the melt index of the copolymers was within the range required of the vinyl acetate copolymer, and although the melt index of the high density polyethylene was the same as several other examples, and and although the melt index of the blend was well within the range found useful for vinyl acetate-ethylene copolymer blends with high density polyethylene, and although the product was molded under the identical conditions of the other examples, the product was invariably warped.

The effect of the absence of vinyl acetate or diethyl maleate from the composition is illustrated in Example 13 wherein the boxes fractured when tested at less than 5′ and the lids at 44′; furthermore, the molded articles are warped.

The effect of the absence of high density polyethylene and vinyl acetate or diethyl maleate is shown in Example 14 in which the boxes broke at 21′ and the articles were badly warped.

Example 15 shows the effect of operating in the absence of diethyl maleate or vinyl acetate, using high density polyethylene of a melt index of 6. The results are comparable to the results of run 13.

The blends of the present invention are useful in processes other than injection molding, for example the polymer may be used in the manufacture of blown film, in the production of fibers and filaments by extrusion methods, and in the production of molded articles from molding powder.

Various pigments and dyes can be satisfactorily added to this composition, and various light stabilizers such as bis phenols, may be advantageously added to this composition.

I claim:

1. A composition of matter comprising a blend of high density polyethylene having a density of .940 to .970 g./cc. and a copolymer of ethylene and vinyl acetate, said high density polyethylene being present in an amount of between 10 and 50% by weight of the mixture, said blend having a melt index of about 5 to 25 g./10 min.

2. The composition of claim 1 in which the vinyl acetate is present as polymerized units in the copolymer in an amount of from 1 to 12% by weight of the copolymer.

3. A composition of matter consisting essentially of a blend of high density polyethylene having a density of .940 to .970 and a melt index of about 6 g./10 min. and a copolymer of ethylene and vinyl acetate having a melt index of about 10 g./10 min., said high density polyethylene being present in an amount of about 25% of the total weight of the composition, and said copolymer being present in an amount of about 75% of the total composition, said vinyl acetate being present in said copolymer as polymerized units in an amount of about 5% by weight of said copolymer, said blend having a melt index of about 8 g./10 min.

4. A composition of matter comprising a blend of 10 to 50% polyethylene having a density of .940 to .970 g./cc. and a melt index of from 1 to 20 g./10 minutes, and 50 to 90% copolymer of ethylene and vinyl acetate containing 1 to 15% polymerized vinyl acetate units, said copolymer having a melt index of from 0.1 to 30 g./10 minutes, and a density of from 0.910 to 0.940, said blend having a melt index up to 25 g./10 minutes and a density of 0.920 to 0.950 g./cc.

References Cited by the Examiner

UNITED STATES PATENTS 2,472,680   6/49   Pratt.
2,543,229   2/51   Chapman.
2,772,247   11/56  Schroeder.
2,944,040   7/60   Pollack et al.
2,953,541   9/60   Pecha et al.
2,975,150   3/61   Johnson et al.
3,029,230   3/62   Strauss _____ 260—87.3

FOREIGN PATENTS 582,093   11/46   Great Britain.
599,566   6/60    Canada.

LEON J. BERCOVITZ, *Primary Examiner.*

D. ARNOLD, *Examiner.*